United States Patent [19]

Wang

[11] Patent Number: 5,581,661
[45] Date of Patent: Dec. 3, 1996

[54] ARTIFICIAL NEURON USING ADDER CIRCUIT AND METHOD OF USING SAME

[76] Inventor: Shay-Ping T. Wang, 1701 E. Edgewood La., Long Grove, Ill. 60047

[21] Appl. No.: 269,243

[22] Filed: Jun. 30, 1994

Related U.S. Application Data

[63] Continuation-in-part of Ser. No. 176,604, Jan. 3, 1994, and a continuation-in-part of Ser. No. 936,992, Aug. 31, 1992, abandoned.

[51] Int. Cl.$^6$ ............................... G06F 15/18; G06E 1/00
[52] U.S. Cl. ................................... 395/27; 395/21; 395/24
[58] Field of Search ................................... 395/24, 27, 21

[56] References Cited

U.S. PATENT DOCUMENTS

| | | | |
|---|---|---|---|
| 5,111,531 | 5/1992 | Grayson et al. | 395/23 |
| 5,220,559 | 6/1993 | Tsuzuki et al. | 370/60 |
| 5,278,945 | 1/1994 | Basehore et al. | 395/27 |
| 5,355,436 | 10/1994 | Shin et al. | 395/4 |
| 5,408,588 | 4/1995 | Ulug | 395/23 |

Primary Examiner—Robert W. Downs
Assistant Examiner—A. Katbab
Attorney, Agent, or Firm—Michael K. Lindsey; Bruce E. Stuckman

[57] ABSTRACT

An artificial neuron, which may be implemented on an integrated circuit, has only one significant processing element in the form of an adder. Inputs are first fed through gating functions to produce gated inputs. These gated inputs are then added together to produce a sum which is added to a weight to produce the neuron output.

6 Claims, 6 Drawing Sheets

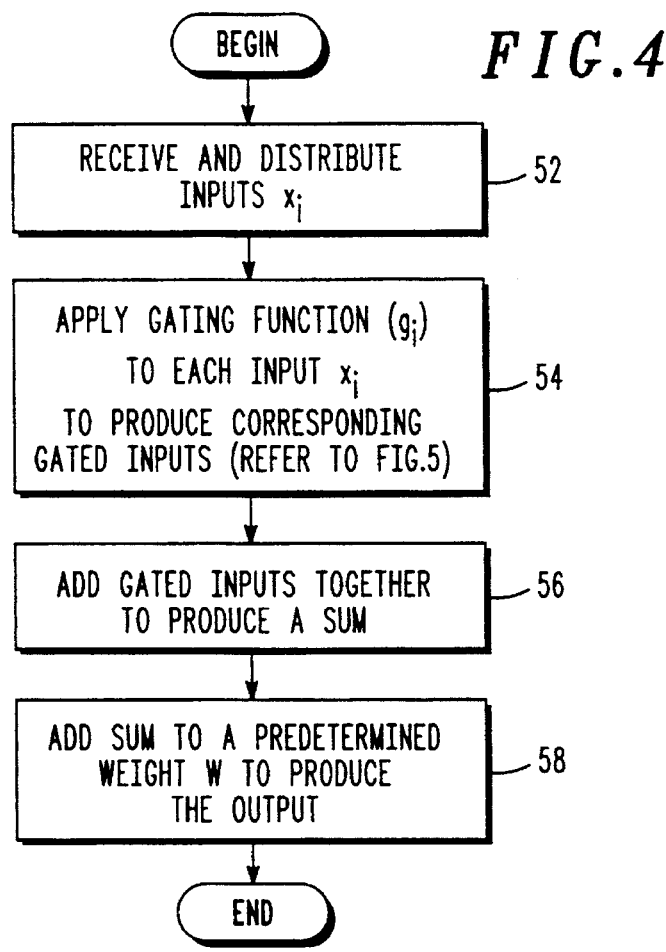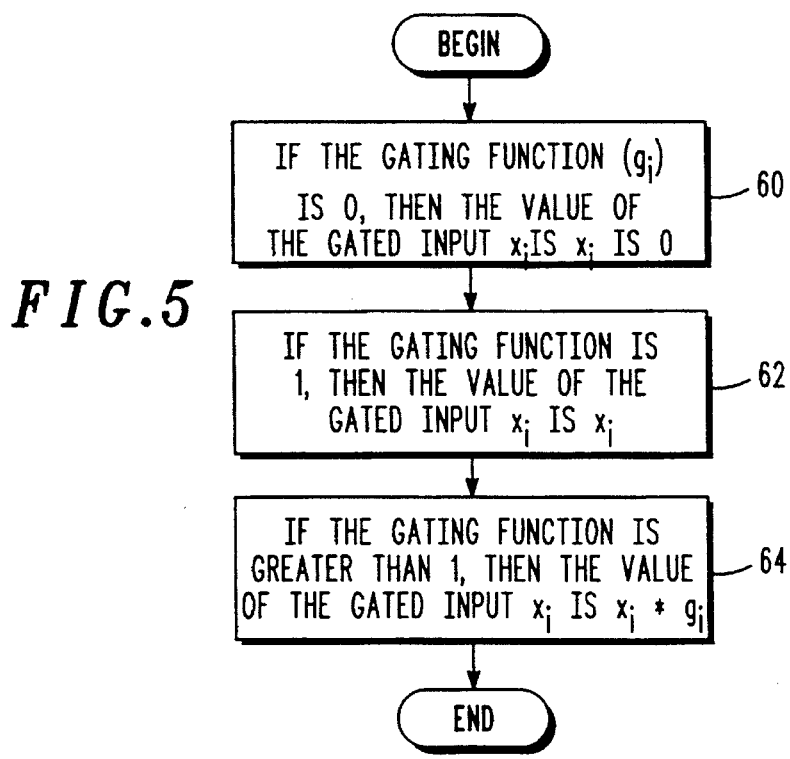

5,581,661

ARTIFICIAL NEURON USING ADDER CIRCUIT AND METHOD OF USING SAME

RELATED INVENTIONS

The present invention is related to the following inventions which are assigned to the same assignee as the present invention:

(1) "Artificial Neuron Circuit and Method of Using Same", having Ser. No. 08/076,602; now U.S. Pat. No. 5,390,136;

(2) "Neural Network and Method of Using Same", having Ser. No. 08/076,601; now U.S. Pat. No. 5,517,667;

(3) "Neural Network Utilizing Logarithmic Function and Method of Using Same", having Ser. No. 08/176,601.

In addition, this application is a continuation-in-part of copending application having Ser. No. 08/176,604 filed 3 Jan. 1994 and application having Ser. No. 07/936,992 filed 31 Aug. 1992, now abandoned.

TECHNICAL FIELD

This invention relates generally to artificial neurons and, in particular, to an artificial neuron that can take the form of a neuron circuit which can be employed as the building block of a neural network that can be implemented in a VLSI (very large scale integration) chip, and which artificial neuron utilizes a training algorithm that does not require repetitive training and that yields a global minimum to each given set of input vectors.

BACKGROUND OF THE INVENTION

Artificial neural networks have utility in a wide variety of computing environments, such as speech recognition, process control, optical character recognition, handwriting recognition, continuous logic or fuzzy logic, engineering and scientific computations, signal processing, and image processing. Processing engines for many of the foregoing computing environments may be implemented through neural networks comprising a plurality of elemental logic elements called neuron circuits.

A neuron circuit (or processing element) is the fundamental building block of a neural network. A neuron circuit has multiple inputs and one output. As discussed in Related Invention No. 1 above, the structure of a conventional neuron circuit often includes a multiplier circuit, a summing circuit, a circuit for performing a non-linear function (such as a binary threshold or sigmoid function), and circuitry functioning as synapses or weighted input connections. Related Invention No. 1 discloses, in one embodiment, a neuron circuit which comprises only a multiplier as its main processing element.

While the neuron circuit disclosed in Related Invention No. 1 represents a very significant advance over the previously known prior art, it would be desirable to provide an improved neuron circuit which has at least the advantages of that disclosed in Related Invention No. 1 and which is even simpler and less expensive and which requires even less silicon space when implemented on an integrated circuit.

Therefore there is a significant need for a neuron circuit as described above and which can form the basis of a neural network which does not require lengthy training cycles and which converges on a global solution in a single training cycle.

SUMMARY OF THE INVENTION

In one embodiment of the present invention there is provided an artificial neuron which uses only adder circuits as its main processing elements. Therefore, many more neuron circuits can be integrated in a VLSI chip, which greatly increases the computational power of a neural network using one or more of such chips.

Moreover, in contrast to conventional neural networks, a neural network constructed of a plurality of artificial neurons in accordance with the present invention as disclosed in the above-identified Related Invention No. 3, converges on a global solution in a single training cycle (also referred to as an epoch or iteration) which can often be computed in no more than a few minutes on a personal computer.

Thus it will be appreciated that a neural network comprising artificial neurons in accordance with the present invention performs with vastly more accurate results, at a vastly improved reduction in computational time, and with a vast reduction in the cost and complexity of its implementation, particularly on a semiconductor chip.

Thus it is one advantage of the present invention to provide a neuron circuit which comprises a minimum of circuit elements so that a neural network may be built comprising a very large number of such neuron circuits, resulting in a product which is commercially competitive due to its high level of functionality and low cost of manufacture.

It is also an advantage of the present invention to provide an artificial neuron which comprises only an adder as its main processing element.

Yet another advantage of the present invention is to provide an artificial neuron which can be utilized as the building block of a neural network (disclosed in the above-identified Related Invention No. 3) which does not require repetitive training and which yields a global minimum to each given set of input vectors.

It is another advantage of the present invention to provide various methods of using an artificial neuron in accordance with the present invention.

According to one aspect of the invention, there is provided a neuron circuit comprising an adder circuit responsive to a plurality of gated inputs and generating an output, the adder circuit comprising means for adding the gated inputs together to produce a sum, and means for adding the sum to a predetermined weight to generate the output.

According to another aspect of the invention, there is provided in a neuron having a plurality of inputs $x_i$, wherein i is a positive integer, a method of producing an output comprising (a) applying a gating function ($g_i$) to each of the inputs $x_i$ to produce a corresponding plurality of gated inputs; (b) adding the gated inputs together to produce a sum; and (c) adding the sum to a predetermined weight W.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 4 shows a flow diagram of an alternative method of using a neuron circuit in accordance with the present invention.

FIG. 5 shows a flow diagram of a gating function which may form part of the methods of using a neuron circuit illustrated in FIGS. 3 and 4.

DETAILED DESCRIPTION OF A PREFERRED EMBODIMENT

It will be understood by one of ordinary skill in the art that the terms "neuron circuit" and "neuron" are used interchangeably in this description, as are the terms "multiplier circuit" or "multiplier", and the terms "adder", "summing circuit", or "summer", depending upon the type of implementation.

Figure 1:
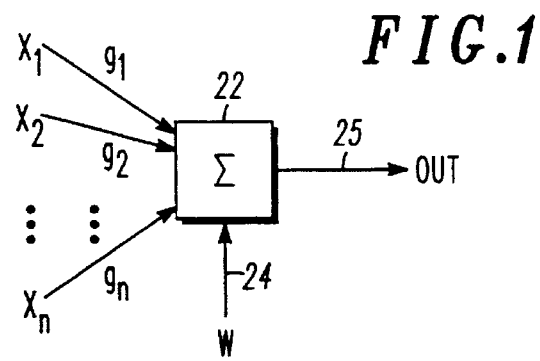
FIG. 1 shows a conceptual block diagram of an artificial neuron in accordance with a preferred embodiment of the invention.

With reference now to FIG. 1, a conceptual block diagram of an artificial neuron in accordance with a preferred embodiment of the invention is shown. Inputs $x_1, x_2, \ldots, x_n$ are gated by respective gating functions $g_1, g_2, \ldots, g_n$ to produce gated inputs that are multiples of $g_1, g_2, \ldots, g_n$. For example, if $g_i=0$, then the gated input corresponding to input $x_i$ is $0 * x_i$ or simply 0; if $g_i=1$, then the gated input corresponding to input $x_i$ is $x_i$; if $g_i=2$, then the gated input corresponding to input $x_i$ is $2 * x_i$, and so forth.

The gated inputs $g_1 * x_1, g_2 * x_2, \ldots, g_n * x_n$ are summed together in adder 22, and their summation is added to a weight W being input over line 24. The resulting summation is the output (OUT) from adder 22 over line 25.

As is explained in further detail in the above-identified Related Invention No. 3, the appropriate values of $g_i$ and $w_i$ are determined by the individual terms of a polynomial expansion or orthogonal function which is utilized as the basis of operation of a neural network incorporating a plurality of the herein-described artificial neurons.

Figure 2:
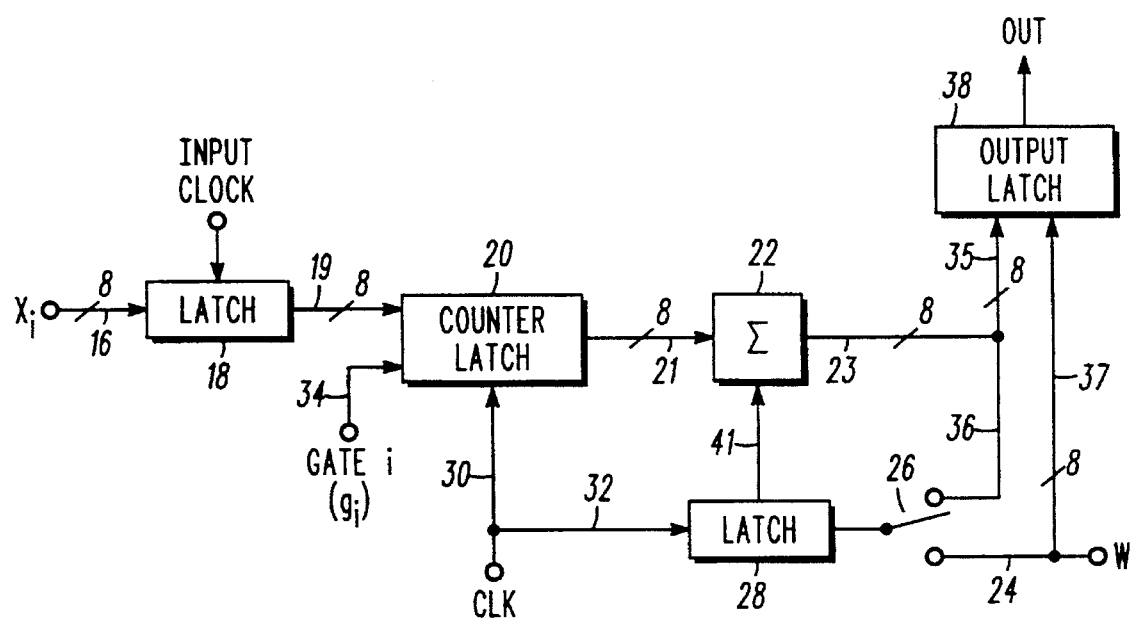
FIG. 2 shows a logic circuit implementation of a neuron circuit employing an adder circuit in accordance with a preferred embodiment of the invention.

It will be understood by one of ordinary skill in the art that the artificial neuron shown in FIG. 1 may be implemented in many different ways, one of which is shown in FIG. 2.

FIG. 2 is a logic circuit implementation of the neuron circuit of the present invention which is conceptually shown in FIG. 1. In this embodiment, a plurality of inputs $x_i$ are sequentially applied to the neuron circuit.

The neuron circuit comprises five primary elements: counter/latch 20, adder 22, multiplexer (MUX) 26, latch 28, and output latch 38. An input latch 18 is also shown as part of this circuit implementation; however, in a neural network comprising a plurality of neuron circuits, as disclosed, for example, in the above-identified Related Invention No. 3, a single input latch 18 may be shared by a plurality of neuron circuits. Adder 22 represents the only significant processing element of the neuron circuit.

Although FIG. 2 shows data busses 16, 19, 21, 23, 24, 35, 36, 37, and 41 as being eight bits in width, it will be understood by one of ordinary skill in the art that the widths of data busses may be 16 bits or any other desired value.

Input latch 18 receives inputs $x_i$ over data bus 16. Input latch 18 is controlled by an INPUT CLOCK which is generated when the count in counter/latch 20 reaches 0. It will be understood by one of ordinary skill that a neural network comprises many neuron circuits, each of which may comprise a counter/latch circuit, and that the INPUT CLOCK will not be generated until the count in all of such counter/latches reaches 0.

The output of input latch 18 is fed to counter/latch 20 via, for example, an 8-bit data bus 19.

Counter/latch 20 and latch 28 are responsive to an internal clock signal (CLK). CLK increments at a constant rate. Counter/latch 20 and latch 28 receive CLK via lines 30 and 32, respectively.

Counter/latch 20 serves to hold the input data for a desired number of CLK cycles in order to produce the desired gating function. Counter/latch 20 is responsive to a gating input line 34 over which are provided values $g_i$ for the corresponding input values $x_i$.

As explained above regarding FIG. 1, inputs $x_1, x_2, \ldots x_n$ are gated by respective gating functions $g_1, g_2, \ldots g_n$ to produce gated inputs $g_i * x_i$. For example, if $g_i=2$, then the gated input corresponding to input $x_i$ is $2 * x_i$.

The output of counter/latch 20 is provided to adder 22 via an 8-bit data bus 21. The output of latch 28 is provided to adder 22 via an 8-bit data bus 41. The output of adder 22 is coupled to the input of latch 28 via 8-bit data bus segments 23 and 36 and via multiplexer 26. Multiplexer 26 multiplexes the output values of adder 22, received over bus segment 36, and weight W, received over bus 24, to the input of latch 28.

The output of adder 22 is also coupled to the input of output latch 38 via 8-bit data bus segment 35. Weight W is also coupled to an input of output latch 38 via an 8-bit bus segment 37. For certain calculations it will be understood that W can be sent to output latch 38 directly, bypassing the adder 22.

At the start of a computational cycle MUX 26 is switched to data bus 24 to receive weight W. After adder circuit 22 generates the first summation, MUX 26 switches to couple line 36 to latch 28.

Latch 28 temporarily holds the output of adder 22 for addition with the output of counter/latch 20.

Counter/latch 20 functions as a count-down circuit, in that it is initially loaded with the value of gi and counts down to $g_i=0$. As will be explained in greater detail below, for each internal clock cycle the value of $g_i$ which has been applied to counter/latch 20 over line 34, and is being stored therein, is reduced by one, and so long as $g_i$ is not equal to 0, the input value $x_i$ is continued to be added by the summation of the previous addition cycle, which is applied over bus segments 23 and 36, through MUX 26, to latch 28. When $g_i=0$, adder 22 stops adding, and the output of adder 22, appearing at the output latch 38, represents the output (OUT) of the neuron circuit.

The neuron circuit of the embodiment shown in FIG. 2 thus generates an output of the form $W+g_1x_1+g_2x_2+g_3x_3+g_4x_4+\ldots g_nx_n$.

Figure 3:
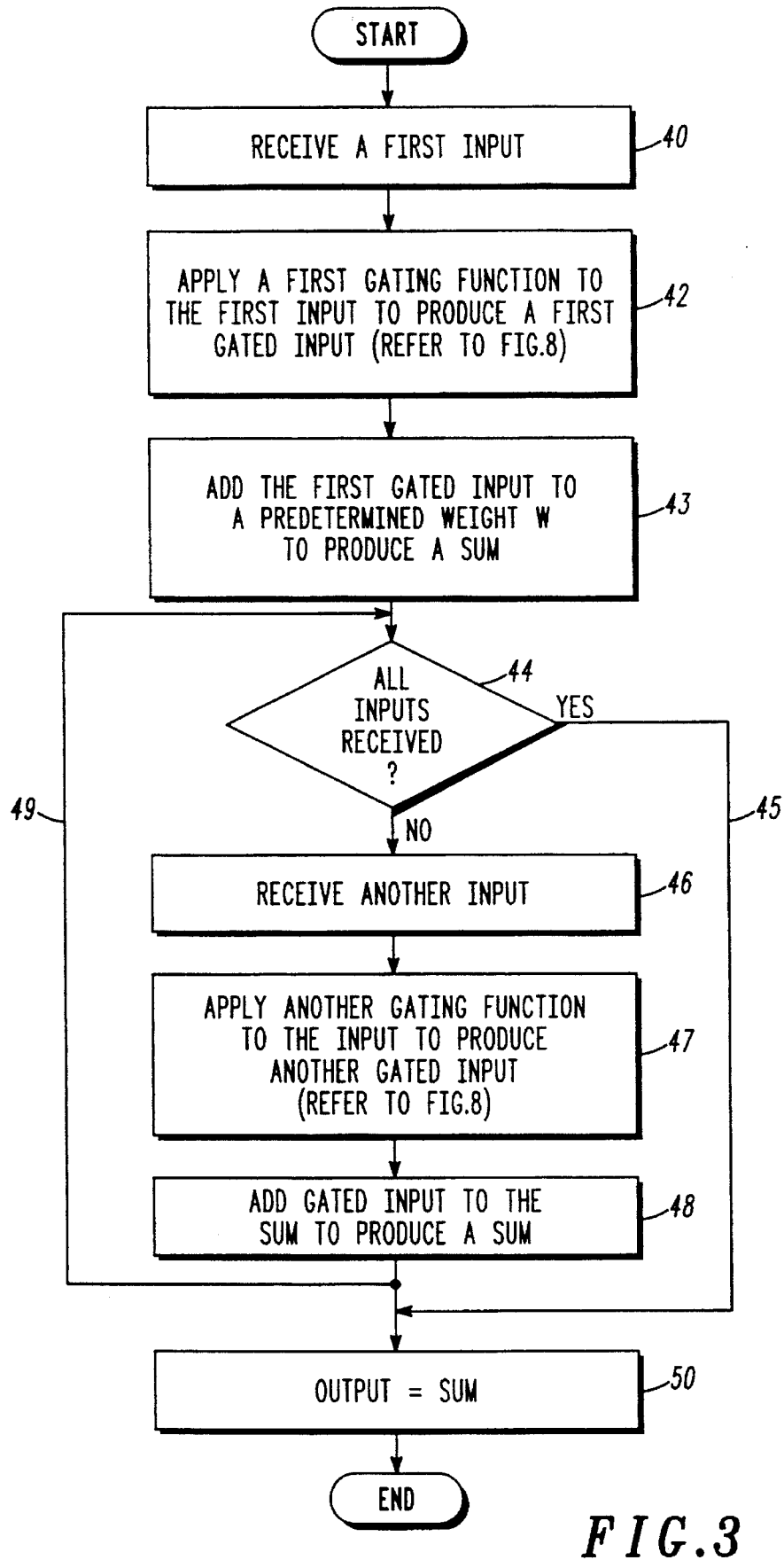
FIG. 3 shows a flow diagram of a method of using a neuron circuit in accordance with a preferred embodiment of the invention.

FIG. 3 shows a flow diagram of a method of using a neuron circuit in accordance with a preferred embodiment of the invention. The method whose steps are illustrated in FIG. 3 relates to the neuron circuit shown in FIG. 2.

As illustrated in box 40, a first input is received by the neuron circuit, e.g. by latch 18 (FIG. 2).

Next, as illustrated in box 42, a first gating function is applied to the first input to produce a first gated input. The gating function is shown in greater detail in FIG. 5, discussed below.

Next, as illustrated in box 43, the first gated input is added to a predetermined weight W to produce a sum.

Next, regarding decision box 44, a check is made to determine whether all inputs have yet been received. If so, the procedure is finished with the current batch of inputs, and it exits via line 45. If not, the procedure proceeds to box 46.

As illustrated in box 46, another input is received by the neuron circuit.

Next, regarding box 47, another gating function is applied to this input to produce another gated input.

Then, in box 48, the gated input produced in box 47 is added to the sum produced in box 43 (or previously produced in box 48, if this is not the first time through box 48) to produce a sum.

The procedure then returns to decision box 44 via line 49.

After the procedure has dealt with all inputs, and it exits decision box 44 via line 45 into box 50, where the final sum represents the output of the neuron circuit.

FIG. 4 shows a flow diagram of an alternative method of using a neuron circuit in accordance with the present invention. The method whose steps are illustrated in FIG. 4 relates to the artificial neuron shown in FIG. 1.

As illustrated in box 52, a plurality of inputs $x_i$ are received by the artificial neuron and distributed to the adder circuit.

As illustrated in box 54, as the plurality of inputs $x_i$ are distributed to the adder, a gating function is applied to each of them to produce a corresponding plurality of gated inputs. The gating function is shown in greater detail in FIG. 5, discussed below.

As illustrated in box 56, the gated inputs are added together to produce a sum. Then, as illustrated in box 58, the sum is added to a predetermined weight W to produce a sum representing the output of the artificial neuron.

FIG. 5 shows a flow diagram of a gating function which may form part of the methods of using a neuron circuit illustrated in FIGS. 3 and 4.

With reference to FIGS. 1 and 5, the gating function applicable to the inputs $x_i$ of the neuron circuit may be expressed by the following: (a) if the gating function $g_i$ is 0, pass 0 to the adder circuit 22 (refer to box 60 of FIG. 5); (b) if the gating function $g_i$ is 1, pass the input $x_i$ to the adder circuit 22 (refer to box 62); and if the gating function is greater than 1, pass the input $x_i$ multiplied by $g_i$ to the adder circuit 22 (refer to box 64).

The neuron circuit of the embodiment shown in FIG. 1 thus generates an output of the form $W+g_1 x_1 + g_2 x_2 + \ldots g_n x_n$.

DESCRIPTION OF A PREFERRED EMBODIMENT

With reference now to FIG. 2, the operation of a preferred embodiment of the invention will be described. In the example given below, the objective is to generate a neuron circuit output of $6+3x_1+2x_2$ for any value of input variables $x_1$ and $x_2$.

This will be explained with reference to Table I below.

Initially counter/latch 20 is loaded with the value $g_1=3$. Because the $g_i$ count is not equal to 0, the value $x_1$ will pass to the adder 22 (in accordance with the gating function described above regarding FIG. 8) to be added with W=6 on line 24 through MUX 26.

Then counter/latch 20 begins counting down, and, so long as the $g_i$ count is not equal to 0, $x_1$ will continually be added to the summation from the adder 22. When the $g_i$ count reaches 0, then adder 22 will cease addition (or will simply continue adding by 0, depending upon the implementation of a neural network incorporating the neuron circuit) and wait for the next input $x_2$. At this point the intermediate output of the neuron circuit is $6+3x_1$.

When INPUT CLOCK=2, and $x_2$ is latched into latch 18, and $g_2=2$ is loaded into counter/latch 20, the operation continues essentially as described above until counter/latch 20 counts down to 0. At this point the final output of the neuron circuit is $6+3x_1+2x_2$.

The detailed operation is described by Table I below.

TABLE I

| INPUT CLOCK SEQUENCE | CLK SEQUENCE | COUNTER/ LATCH | OUTPUT |
|---|---|---|---|
| 1 | 1 | 3 | $6 + x_1$ |
| 1 | 2 | 2 | $6 + 2x_1$ |
| 1 | 3 | 1 | $6 + 3x_1$ |
| 1 | 4 | 0 | $6 + 3x_1$ |
| 2 | 5 | 2 | $6 + 3x_1 + x_2$ |
| 2 | 6 | 1 | $6 + 3x_1 + 2x_2$ |
| 2 | 7 | 0 | $6 + 3x_1 + 2x_2$ |
| 2 | 8 | — | $6 + 3x_1 + 2x_2$ |

While in this example the weight of the neuron circuit was added at the beginning of the computational cycle, it will be understood that it may be added at any appropriate time.

Figure 6:
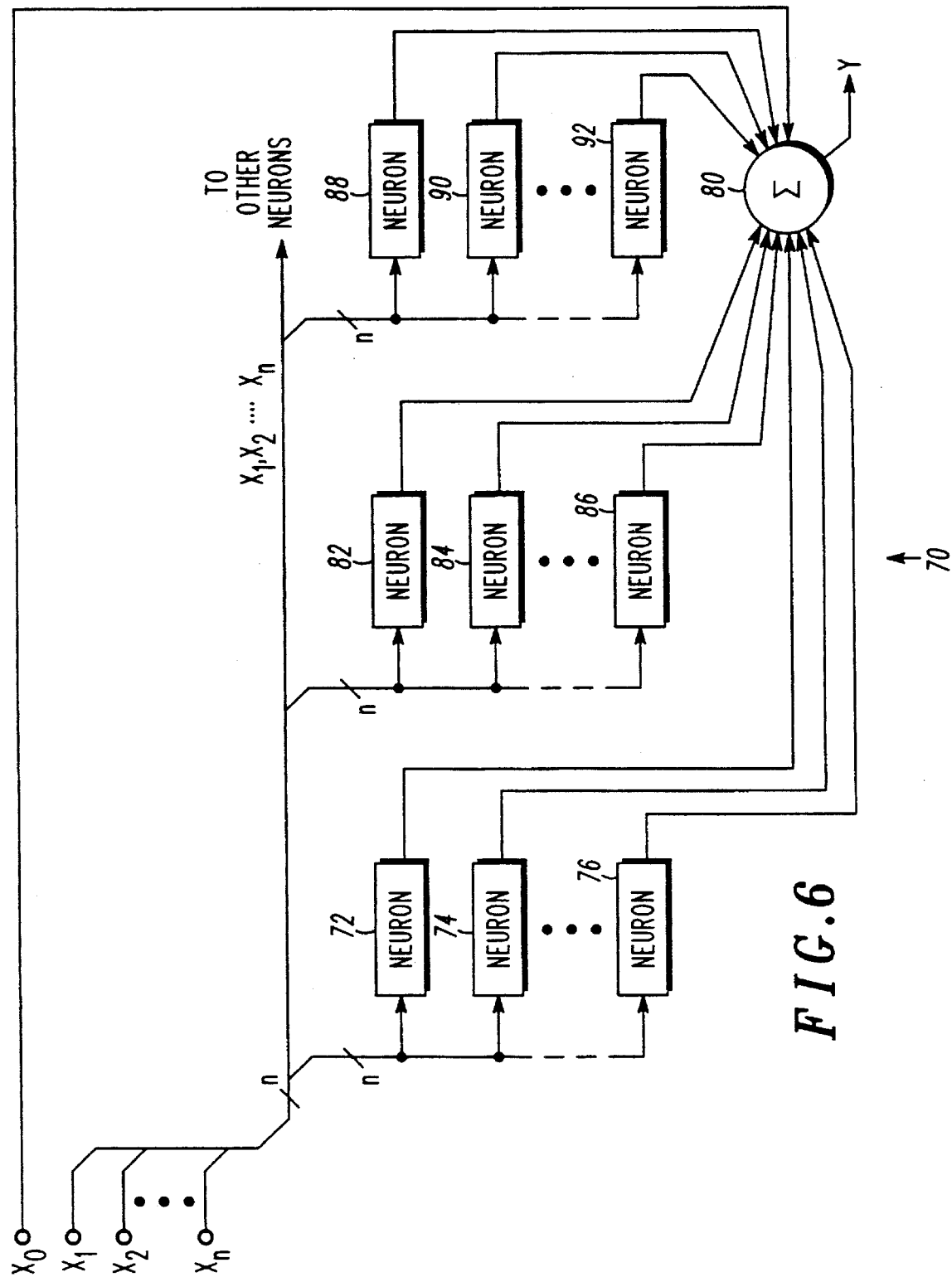
FIG. 6 is a block diagram illustrating a general form of a single layer neural network.

An artificial neural network 70 is shown in FIG. 6 suitable for manufacturing as an integrated circuit using conventional integrated circuit processes. An input signal vector $X_1$, $X_2$ through $X_n$ is applied to neurons 72, 74 and 76, where "n" is the number of input signals. The outputs of neurons 72, 74 and 76 are coupled to inputs of summing circuit 80. Neurons 82, 84, 86, 88, 90 and 92 also receive the input signal vector $X_1$, $X_2$ through $X_n$ and provide output signals to summing circuit 80. The input signal $X_0$ is directly applied to summing circuit 80. The output of summing circuit 80 provides the output signal Y of neural network 70. Additional stacks of neurons like 88–92 may be included as necessary to properly define the function of neural network 70. The number of neurons in a stack depend on the complexity of the desired function.

Figure 7:
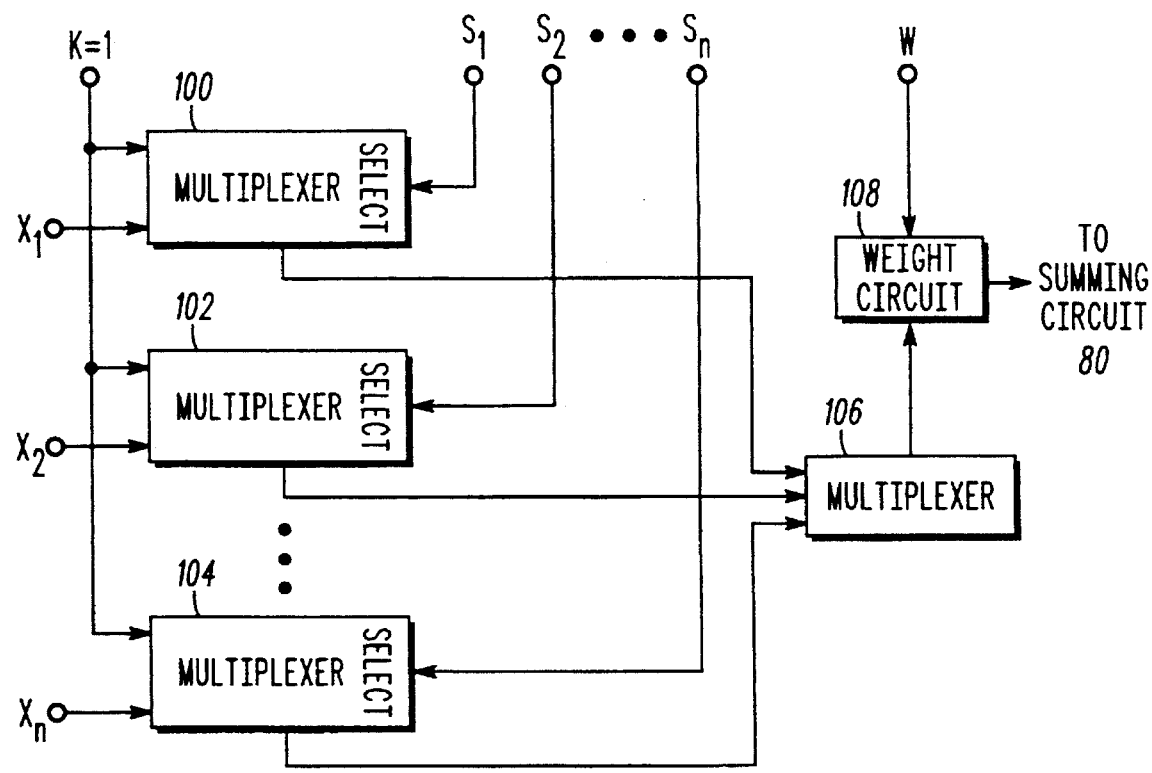
FIG. 7 is a block diagram illustrating a further embodiment of a neuron.

An embodiment of neuron 72, utilizing a multiplier, is illustrated in FIG. 7 where the input signals $X_1$, $X_2$ and $X_n$ are applied at first inputs of multiplexers 100, 102 and 104, respectively. The second inputs of multiplexers 100–104 receive a constant signal K=1. Multiplexer 100 receives select signal $S_1$ at its select input, while multiplexer 102 receives select signal S2, and multiplexer 104 receives select signal $S_n$. The select signals $S_1$, $S_2$ and $S_n$ may be generated from an external controller or microprocessor (not shown). Multiplexers 100–104 each provide an independent gating function such that either the constant signal K=1 or the input signals $X_1$, $X_2$ and $X_n$ are passed through multiplexers 100, 102 and 104 in response to select signals $S_1$, $S_2$ and $S_n$, respectively. For example, if select signal $S_1$ is logic zero, multiplexer 40 passes input signal $X_1$ to multiplier 106. Alternately, if select signal $S_1$ is logic one, multiplexer 100 passes constant K=1 to multiplier 106. It is understood that other gating circuits could switch between the constant signal K and functions of $X_n$, i.e., $f(X_n)$, in response to select signal $S_n$.

The outputs of multiplexers 100–104 are coupled to inputs of multiplier 106 for taking a product thereof. The output of multiplier 106 is coupled to an input of weight circuit 108 to form a product of a predetermined weight signal W and the output signal of multiplier 106 for application to summing circuit 80. Weight signal W may also be provided by the external controller. Neurons 74, 76 and 82–92 follow a similar construction.

Specific functions of neural network 70 are implemented by selecting the proper weight signal W and whether multiplexers 100–104 pass input signal $X_n$ or constant signal K. The weights and select signals are precalculated in a single pass and applied by the external controller for neural network 70 to perform the desired function.

Figure 8:
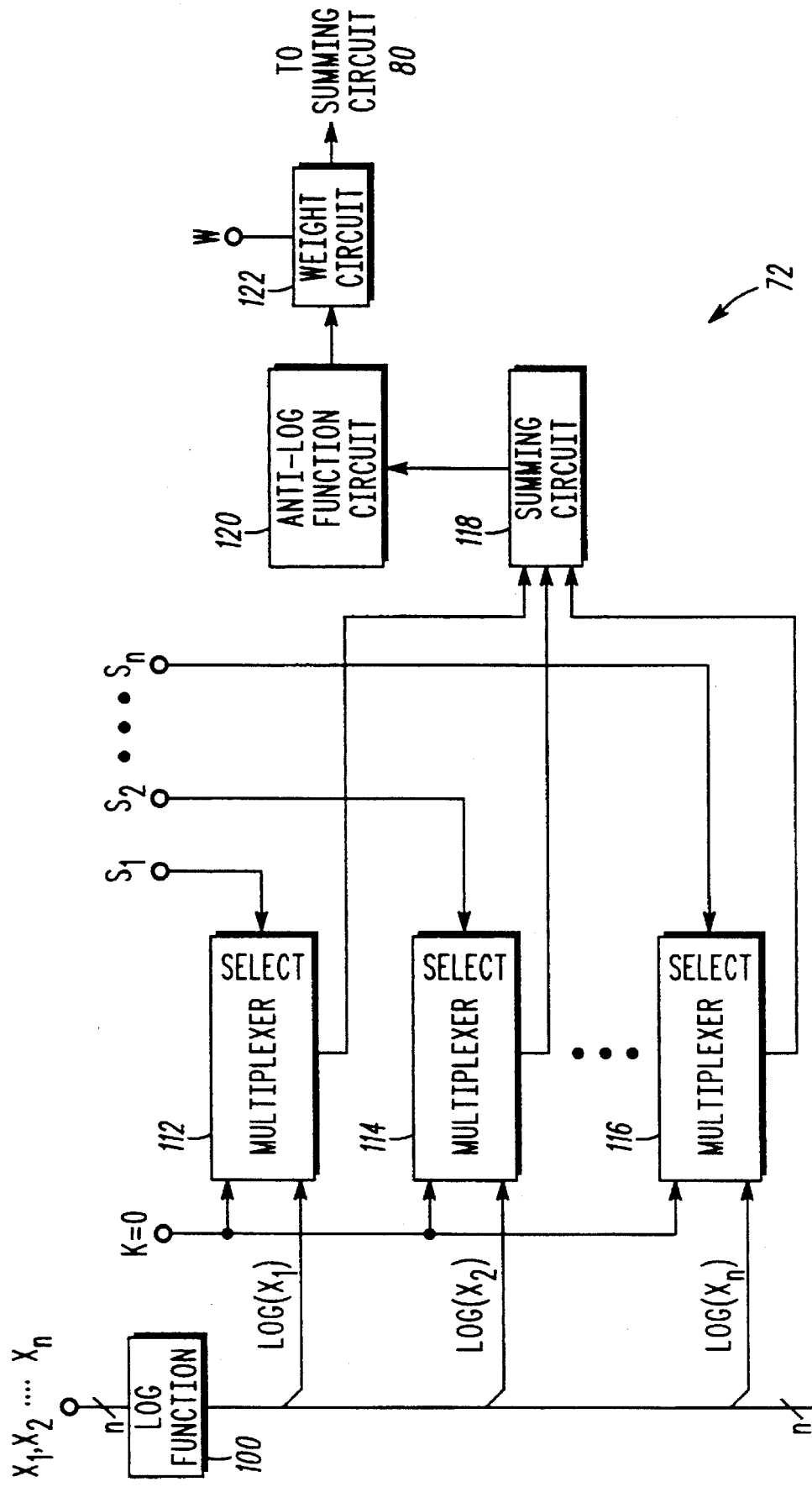
FIG. 8 is a block diagram illustrating an additional embodiment of a neuron.

An alternate embodiment of neurons 72–76 and 82–92 is illustrated in FIG. 8 where the multiplier 106 of FIG. 7 is implemented via a summing circuit 118 in conjunction with log and anti-log functions. The input signals $X_1$, $X_2$ and $X_n$ are processed through log function circuit 110 for providing output signals LOG ($X_1$), LOG ($X_2$) and LOG ($X_n$), respectively, which are applied at first inputs of multiplexers 112, 114 and 116. An embodiment of log function circuit 110 may comprise a math coprocessor working with the external microprocessor to calculate the mathematical LOG ($X_n$). The output signals LOG ($X_1$), LOG ($X_2$) and LOG($X_n$) are calculated once and applied simultaneously to neurons 72–76 and 82–92. The second inputs of multiplexers 112–116 receive a constant signal K=0. Multiplexer 112 receives select signal $S_1$ at its select input, while multiplexer 114 receives select signal $S_2$, and multiplexer 116 receives select signal $S_n$. The outputs of multiplexers 112–116 are coupled to inputs of summing circuit 118. Anti-log function circuit 120 takes the mathematical inverse LOG() of the output signal of summing circuit 118. The output of anti-log function circuit 120 is coupled to an input of weight circuit 122 to form a product of a predetermined signal weight W and the output signal of anti-log function circuit 120 for application to summing circuit 80. The anti-log of the summation of the LOG() of a set of numbers as demonstrated in FIG. 8 is equivalent to the product of the numbers as shown in FIG. 7. The embodiment of FIG. 8 may be desirable in a space limited integrated circuit application because summing circuit 118 generally requires less area than multiplier 106.

Returning to FIG. 6, a general deterministic, single-pass solution for output signal Y of neural network 70 including the first four terms is given as:

$$Y = W_0 + \sum_{i=1}^{n} W_i X_i + \sum_{i=1}^{n} \sum_{j=i+1}^{n} W_{ij} X_i X_j + \qquad (1)$$

$$\sum_{i=1}^{n} \sum_{j=i+1}^{n} \sum_{k=i+1,j+1}^{n} W_{ijk} X_i X_j X_k + \ldots$$

Relating equation (1) to FIG. 6, the first term $W_0$ is constant and set equal to $X_0$. The second term $$\sum_{i=1}^{n} W_i X_i$$

from equation (1) is performed by neurons 72–76, and the third term $$\sum_{i=1}^{n} \sum_{j=i+1}^{n} W_{ij} X_i X_j$$

is performed by neurons 82–86, and the fourth term $$\sum_{i=1}^{n} \sum_{j=i+1}^{n} \sum_{k=i+1,j+1}^{n} W_{ijk} X_i X_j X_k$$

is performed by neurons 88–92. Equation (1) may extend as many terms as necessary to accurately model the desired function. For example, the fifth term of equation (1) would contain a four-level summation of variables $W_{ijk1} X_i X_j X_k X_1$. Additional terms would require more neuron stacks like 88–92.

Consider implementing an exclusive-OR (XOR) function in neural network 70. For a two-input XOR gate (n=2), only the first, second and third terms of equation (1) are used (number of inputs=number of terms, not counting $W_0$) to solve for $W_1$, $W_2$ and $W_{12}$ as shown in equation (2):

$$Y = W_0 + \sum_{i=1}^{n} W_i X_i + \sum_{i=1}^{n} \sum_{j=i+1}^{n} W_{ij} X_i X_j \qquad (2)$$

$$Y = W_0 + W_1 X_1 + W_2 X_2 + W_{12} X_1 X_2$$

First, a mathematical model of the XOR function is needed. The well known XOR truth table is shown in table II as follows:

TABLE II

| x1 | x2 | OUT |
|---|---|---|
| 0 | 0 | 0 |
| 0 | 1 | 1 |
| 1 | 0 | 1 |
| 1 | 1 | 0 |

Next, the mathematical model of the XOR truth table is coded according to the following general equation:

$$X_i = \frac{2(x_i - A_i)}{|D_i|} \qquad (3)$$

where:

$x_i$=original values $A_i$=average of largest and smallest values (mean)

$D_i$=difference between largest and smallest value $X_i$=coded value

For example, $x_1$ takes on values 0, 0, 1, 1 from table II. The average $A_1$=(0+1)/2=0.5, and the difference $D_1$=1−0=1. Thus, $X_1$ has values −1, −1, +1, +1. Likewise, $x_2$ takes on values 0, 1, 0, 1 from table II. The average $A_1$=(0+1)/2=0.5, and the difference $D_1$=1−0=1. Thus, $X_2$ has values −1, +1, −1, +1. The OUT values remain the same, see table II. The general equations (1) and (2) work for any digital function, e.g., AND, OR, NAND and NOR.

TABLE III

| X1 | X2 | OUT |
|---|---|---|
| −1 | −1 | 0 |
| −1 | +1 | 1 |
| +1 | −1 | 1 |
| +1 | +1 | 0 |

To solve for weights $W_1$, $W_2$ and $W_{12}$, a general matrix is formed in table IV as follows:

TABLE IV

| X1 | X2 | X1X2 | OUT |
|---|---|---|---|
| $a_{11}$ | $a_{12}$ | $a_{13}$ | $Y_1$ |
| $a_{21}$ | $a_{22}$ | $a_{23}$ | $Y_2$ |
| $a_{31}$ | $a_{32}$ | $a_{33}$ | $Y_3$ |
| $a_{41}$ | $a_{42}$ | $a_{43}$ | $Y_4$ |

The general solution for weights $W_1$, $W_2$ and $W_{12}$ using table IV with n=2; $N=2^n=4$ is:

$$W_0 = \frac{\sum_{i=1}^{N} Y_i}{N} \qquad (4)$$

$$W_1 = \frac{\sum_{i=1}^{N} a_{i1} Y_i}{N} \qquad (5)$$

$$W_2 = \frac{\sum_{i=1}^{N} a_{i2} Y_i}{N} \qquad (6)$$

$$W_{12} = \frac{\sum_{i=1}^{N} a_{i3} Y_i}{N} \qquad (7)$$

For the two-input XOR function taken from the coded inputs $X_1$ and $X_2$ in table III, the general matrix of table IV has a specific form:

TABLE V

| X1 | X2 | X1X2 | OUT |
|---|---|---|---|
| −1 | −1 | +1 | 0 |
| −1 | +1 | −1 | 1 |
| +1 | −1 | −1 | 1 |
| +1 | +1 | +1 | 0 |

Combining equations (4)–(7) and table V, weights $W_1$, $W_2$ and $W_{12}$, are calculated as follows:

$$W_0=(0+1+1+0)/4=0.5 \qquad (8)$$

$$W_1=[(-1)(0)+(-1)(+1)+(+1)(+1)+(+1)(0)]/4=0 \qquad (9)$$

$$W_2=[(-1)(0)+(+1)(+1)+(-1)(+1)+(+1)(0)]/4=0 \qquad (10)$$

$$W_{12}=[(1)(0)+(-1)(+1)+(-1)(+1)+(+1)(0)]/4=-0.5 \qquad (11)$$

Referring to FIG. 6, neurons 72 and 74 correspond to the terms $W_1 X_1$ and $W_2 X_2$ of equation (2), respectively. The weight $W_1=0$ is applied to weight circuit 108 of neuron 72 in FIG. 7 to zeroize any signal coming from multiplier 106 of neuron 72. The output of neuron 72 is zero to summing circuit 80. Likewise, the weight $W_2=0$ is applied to weight circuit 108 of neuron 74 to zeroize any signal coming from multiplier 106 of neuron 74. The output of neuron 74 is zero to summing circuit 80. Since weights $W_1=W_2=0$ from equation (9) and (10), the state of select signals $S_1$ and $S_2$ do not matter in neurons 72 and 74.

Neuron 82 solves the $W_{12} X_1 X_2$ term of equation (2). The select signals $S_1$ and $S_2$ are set to logic zero to pass input signals $X_1$ and $X_2$ to multiplier 106 of neuron 82. The select signals $S_n$ (n>2) of neuron 82 are set to logic one to pass the constant K=1 through multiplexer 104. The constant K=1 has no effect on multiplier 106 since it involves multiplication by one. The weight $W_{12}=-0.5$ is applied to weight circuit 108 of neuron 82 to weight the output signal of multiplier 86 of neuron 82. The output of neuron 82 is thus $W_{12} X_1 X_2$ to summing circuit 80. The input signal $X_0=W_0$ is set equal to 0.5. Neurons 76, 84–92 are not used for the XOR function so their respective weights W are set equal to zero.

The embodiment of FIG. 8 performs a similar solution of equation (2). The principal difference is that the multiplexers of non-used input signals pass constant K=0 to summing circuit 118 in response to the select signals. The constant K=0 has no effect on summing circuit 118 since it involves an addition of zero.

Figure 9:
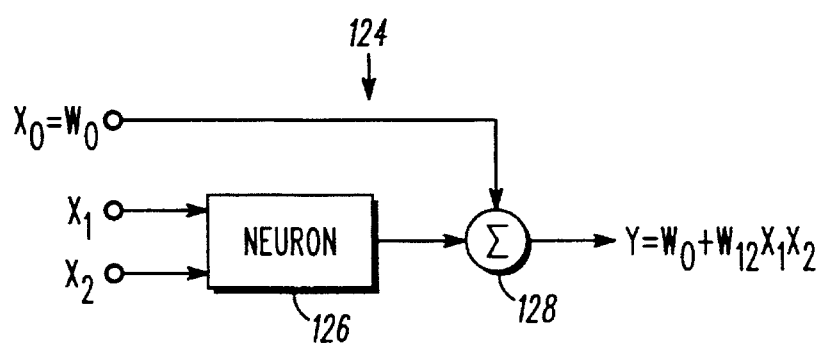
FIG. 9 is a block diagram illustrating a single layer neural network solution to an XOR function.

The XOR function is shown in FIG. 9 in reduced form as neural network 124 with the input signals $X_1$ and $X_2$ feeding neuron 126. The input signal $X_0$ is directly connected to summing circuit 128. The output of neuron 126 is coupled to summing circuit 128 for providing $Y=0.5-0.5 * X_1 X_2$. If $X_1=X_2=-1$, then $Y=0.5-0.5 * (-1)(-1)=0$. If $X_1=X_2=+1$, then $Y=0.5-0.5 * (+1)(+1)=0$. Note input signals $X_1$ and $X_2$ are the coded values derived from equation (3). Alternately, if $X_1=-1$ and $X_2=+1$, then $Y=0.5-0.5 * (-1)(+1)=1$. If $X_1=+1$ and $X_2=-1$, then $Y=0.5-0.5 * (+1)(-1)=1$. Thus, single layer neural network 70 provides a deterministic approach in one pass to achieve a close form solution to the XOR function of table II. Given the mathematical model of the desired function, the necessary input signals and weights can be determined and neurons configured accordingly. The single pass solution eliminates the repetitive training cycles common in the prior art.

Now consider implementing a continuous time analog function, say a discrete Fourier transform of a sinusoidal function, in neural network 70. To simplify the analysis, assume three sample points of the sinusoidal function at the peaks ±1. The general form of the discrete Fourier transformation is given by:

$$F(u) = \sum_{x=0}^{n-1} f(x) e^{-j2\pi ux/n} \qquad (12)$$

where:

n=number of samples j=complex variable $\sqrt{-1}$ x=time domain variable u=frequency domain variable Equation (13) provides the Fourier spectrum frequency components Y(u):

$$Y(u)=|F(u)|; u=0, 1, 2, \ldots, n-1 \qquad (13)$$

Again, it is necessary to develop a mathematical model relating frequency domain output signals to time domain input signals. Equation (1) is still the general deterministic neural network solution. A tabular format for the discrete Fourier transformation with three sample points is given in table VI. The values of input signals $x_1$, $x_2$ and $x_3$ are selected at +1 and −1 at minimum and maximum of the sinusoidal function to simplify the calculation. Any set of real numbers and any number of sample points "n" would follow the same process.

TABLE VI

| Time domain | | | Frequency domain | | |
|---|---|---|---|---|---|
| x0 | x1 | x2 | Y0 | Y1 | Y2 |
| +1 | +1 | +1 | 3 | 0 | 0 |
| +1 | +1 | −1 | 1 | 2 | 2 |
| +1 | −1 | +1 | 1 | 2 | 2 |
| +1 | −1 | −1 | 1 | 2 | 2 |

TABLE VI-continued

| Time domain | | | Frequency domain | | |
|---|---|---|---|---|---|
| x0 | x1 | x2 | Y0 | Y1 | Y2 |
| −1 | +1 | +1 | 1 | 2 | 2 |
| −1 | +1 | −1 | 1 | 2 | 2 |
| −1 | −1 | +1 | 1 | 2 | 2 |
| −1 | −1 | −1 | 3 | 0 | 0 |

The frequency domain output signals $Y_0$, $Y_1$ and $Y_2$ are calculated according to equations (12) and (13). For example:

$$F(0) = \sum_{x=0}^{N-1} f(x) e^{-j2\pi(0)x/N}$$

$$F(0) = f(0) + f(1) + f(2)$$

$$F(0) = (+1) + (+1) + (+2) = 3$$

$$Y_0 = |F(0)| = 3 \quad (14)$$

The general solution of equation (1) is applied once for each output signal $Y_0$, $Y_1$ and $Y_2$. That is, first, second and third neural networks like 70 are needed solve for the output signals $Y_0$, $Y_1$ and $Y_2$, respectively. Note the values of weights $W_0$, $W_1$, $W_2$, $W_{12}$, $W_{13}$, $W_{23}$ and $W_{123}$ may be different for each output signal $Y_n$.

$$Y_n = W_0 + W_1 X_1 + W_2 X_2 + W_{12} X_1 X_2 + W_{13} X_1 X_3 + W_{23} X_2 X_3 + W_{123} X_1 X_2 X_3 \quad (15)$$

Using equations (4)–(7) and table VI as described above, weights $W_0$, $W_1$, $W_2$, $W_{12}$, $W_{13}$, $W_{23}$ and $W_{123}$ are calculated for each of the output signals $Y_0$, $Y_1$ and $Y_2$ as follows:

$$Y_0 = 1.5 + 0.5 \ast X_1 X_2 + 0.5 \ast X_1 X_3 + 0.5 X_2 X_3 \quad (16)$$

$$Y_1 = 1.5 - 0.5 \ast X_1 X_2 - 0.5 \ast X_1 X_3 - 0.5 X_2 X_3 \quad (17)$$

$$Y_2 = 1.5 - 0.5 \ast X_1 X_2 - 0.5 \ast X_1 X_3 - 0.5 X_2 X_3 \quad (18)$$

Again relating the results to FIG. 6, a first neural network 70 solves equation (16). Neurons 72, 74 and 76 correspond to the terms $0.5 \ast X_1 X_2$, $0.5 \ast X_1 X_3$ and $0.5 X_2 X_3$, respectively. The weight W=0 is applied to weight circuit 108 of neurons 82–92 to zeroize each output signal. In neuron 72, select signals $S_1$ and $S_2$ are set to logic zero to pass input signals $X_1$ and $X_2$ to multiplier 106 of neuron 72. Select signals $S_n$ (n>2) of neuron 72 are set to logic one to pass the constant K=1 through multiplexer 104. The constant K=1 has no effect on multiplier 106 of neuron 72. The weight $W_{12}$=0.5 is applied to weight circuit 108 of neuron 72 to weight the output signal of multiplier 106 of neuron 72. The output of neuron 72 is thus $0.5 \ast X_1 X_2$ to summing circuit 80.

Similarly for neuron 74, select signals $S_1$ and $S_n$ (n=3) are set to logic zero to pass input signals $X_1$ and $X_n$ (n=3) to multiplier 106 of neuron 74. Select signal $S_2$ of neuron 74 is set to logic one to pass the constant K=1 through multiplexer 102. The weight $W_{13}$=0.5 is applied to weight circuit 108 of neuron 74 to weight the output signal of multiplier 106 of neuron 74. The output of neuron 74 is $0.5 \ast X_1 X_3$ to summing circuit 80. For neuron 76, select signals $S_2$ and $S_n$ (n=3) are set to logic zero to pass input signals $X_2$ and $X_n$ (n=3) to multiplier 106 of neuron 76. Select signal $S_1$ of neuron 76 is set to logic one to pass the constant K=1 through multiplexer 100. The weight $W_{23}$=0.5 is applied to weight circuit 108 of neuron 76 t0 weight the output signal of multiplier 106 of neuron 76. The output of neuron 76 is $0.5 \ast X_2 X_3$ to summing circuit 80. The input signal $X_0 = W_0$ is set equal to 1.5. Once the input signals $X_1$, $X_2$ and $X_3$ are valid, neurons 72–76 process in parallel and provide output signal $Y_0 = 1.5 + 0.5 \ast X_1 X_2 + 0.5 \ast X_1 X_3 + 0.5 X_2 X_3$ as per equation (16). Again, the external controller may provide weight signals and select signals for neurons 72–76 and 82–92.

A second neural network like 70 solves equation (17) in a similar manner described for equation (16). The difference is the weights applied to weight circuits 108 of neurons 72, 74 and 76 of the second neural network like 70, i.e. $W_{12} = W_{13} = W_{23} = -0.5$. A third neural network like 70 solves equation (18) in a similar manner described for equation (16). The weights applied to weight circuits 108 of neurons 72, 74 and 76 of the third neural network like 70 are $W_{12} = W_{13} = W_{23} = -0.5$ as per equation (18). Thus, the output signals of the first, second and third single layer neural networks like 70 provide three data points in the frequency domain following the discrete Fourier transformation from the time domain of table 5. For more data points in the frequency domain, simply use correspondingly more neural networks like 70.

Thus, multiple single-layer neural networks like 70 provide a deterministic approach in one pass to achieve a close form solution to the discrete Fourier transform of a sinusoidal function. Given the mathematical model of the desired function, the necessary input signals and weights can be determined and neurons configured by solving for the weight values in the predetermined manner as described above and combining the weight values with the input signals according to the disclosed general solution of the neural network.

SUMMARY

Thus there has been described herein a concept, as well as several embodiments including a preferred embodiment, of an artificial neuron, and a method of producing an artificial neuron output, which require only an adder as their primary processing element.

Therefore, more neurons can be integrated in a VLSI chip or in a computer program, thereby greatly increasing the computational power of a neural network employing a plurality of such neurons.

This results in a neural network product having significant commercial advantages over those of the prior art in terms of processing power and speed, cost of manufacture, versatility of application, and market acceptance.

In the above-identified Related Invention No. 3 there are disclosed various embodiments of neural networks which use the herein-disclosed artificial neuron as a basic building block. This is because of the unique functions of such artificial neuron, namely the ability to add together a plurality of gated inputs and to add the resulting summation to a weight value. Because of these properties, the various embodiments of neural networks which are disclosed in the above-identified Related Invention No. 3 may use the herein-disclosed artificial neuron to great advantage in implementing the polynomial expansions or orthogonal functions which form the basis of operation of such neural networks.

Therefore, there has been described herein an artificial neuron that can form the basis of a neural network which does not require lengthy training cycles and which converges on a global solution in a single training cycle.

Furthermore, it will be apparent to those skilled in the art that the disclosed invention may be modified in numerous ways and may assume many embodiments other than the preferred form specifically set out and described above.

Moreover, implementations may be made in which the plurality of inputs xi may be processed in parallel rather than sequentially by appropriate circuitry.

In addition, the output latch may be replaced by a multiplexer.

Accordingly, it is intended by the appended claims to cover all modifications of the invention which fall within the true spirit and scope of the invention.

What is claimed is:

1. In a neuron circuit responsive to a plurality of input signals, a method for generating a neuron output signal, comprising the steps of:

receiving the plurality of input signals;

generating a plurality of gated input signals, each of the gated input signals being generated by transmitting one of the input signals $x_i$ to an adder during $g_i$ addition cycles of the adder, the one of the input signals $x_i$ being added during each of the $g_i$ addition cycles resulting in a gated input having a form $g_i * x_i$, where $g_i$ represents an integer:

receiving a weight signal;

generating a summing signal which represents the sum of the gated input signals and the weight signal; and generating the neuron output signal as a linear function of the summing signal.

2. The method of claim 1 wherein the step of receiving the input signals includes receiving one of the plurality of input signals more than once.

3. A neuron circuit for generating a neuron output signal in response to a plurality of input signals, the neuron circuit comprising:

an adder for generating a summing signal which represents the sum of a plurality of gated input signals and a weight signal, each of the gated input signals being generated by transmitting one of the input signals $x_i$ to the adder during $g_i$ addition cycles of the adder, the one of the input signals $x_i$ being added during each of the $g_i$ addition cycles resulting in a gated input having a form $g_i * x_i$, wherein $g_i$ represents an integer;

wherein the neuron output signal is a linear function of the summing signal.

4. The neuron circuit of claim 3 wherein the input signals include a same input signal more than once.

5. A neuron circuit for generating a neuron output signal in response to a sequence of input signals, the neuron circuit comprising:

an adder for generating a summing signal which represents the sum of a sequence of gated input signal and a weight signal, the adder having a first input responsive to the input signals and a second input responsive to a multiplexer output signal, wherein each of the gated input signals is generated by transmitting one of the input signals $x_i$ to the adder during $g_i$ addition cycles of the adder, the one of the input signals $x_i$ being added during each of the $g_i$ addition cycles resulting in a gated input signal having a form $g_i * x_i$, where $g_i$ represents an integer; and a multiplexer for generating the multiplexer output signal which selectively represents either the summing signal or a weight signal;

wherein the weight signal is added to one of the input signals during an addition cycle of the adder and remaining input signals are added to the summing signal during other addition cycles of the adder, and the neuron output signal is a linear function of the summing signal.

6. The neuron circuit of claim 5 wherein the input signals include a same input signal more than once.

* * * * *